United States Patent [19]

Swartzendruber

[11] Patent Number: 4,958,535
[45] Date of Patent: Sep. 25, 1990

[54] TRANSMISSION CONTROL STRUCTURE INCLUDING A COMBINATION DIRECTION AND CRUISE CONTROL AND A BRAKE INTERLOCK

[75] Inventor: James A. Swartzendruber, West Bend, Wis.

[73] Assignee: Deere & Company, Moline, Ill.

[21] Appl. No.: 324,363

[22] Filed: Mar. 15, 1989

[51] Int. Cl.$^5$ ............................................ C09G 11/00
[52] U.S. Cl. ........................................ 74/481; 74/474
[58] Field of Search ................. 74/471 R, 471, 474, 74/482, 481, 483 R, 480 R, 878, 475

[56] References Cited

U.S. PATENT DOCUMENTS

| | | | |
|---|---|---|---|
| 3,313,174 | 4/1967 | Walker et al. | 74/474 |
| 4,341,129 | 7/1982 | Bando | 74/481 |
| 4,346,617 | 8/1982 | Schroeder et al. | 74/481 |
| 4,496,035 | 1/1985 | Wanie | 74/474 X |
| 4,608,879 | 9/1986 | Ishida et al. | 74/474 |
| 4,759,417 | 7/1988 | Wanie et al. | 180/6.34 |

*Primary Examiner*—Leslie A. Braun
*Assistant Examiner*—Khoi Q. Ta

[57] ABSTRACT

Direction and transmission ratio control structure including a direction control lever movable between reverse and forward selecting positions and movable from the forward selecting position to a cruise control position wherein a preselected transmission speed ratio is maintained. The transmission speed ratio is selected by a foot pedal connected through a link and a shuttle pivot to the transmission control rod. The shuttle pivot includes a tooth portion which is engageable by a pawl located at the lower end of the direction control lever. Movement of the lever from the forward to the cruise control position moves the pawl into engagement with the tooth portion of the shuttle pivot. The pawl is automatically disengaged when the lever is moved from the cruise control position or when the brake pedal is operated. The link and shuttle pivot are operably associated with the direction control lever so that the speed ratio of the transmission is increased by depressing the foot pedal regardless of whether the direction control lever is in the forward or the reverse selecting position. A single latch is operable to both lock the brakes in an engaged condition and maintain the lever in a neutral position wherein the speed ratio control is disabled.

23 Claims, 3 Drawing Sheets

TRANSMISSION CONTROL STRUCTURE INCLUDING A COMBINATION DIRECTION AND CRUISE CONTROL AND A BRAKE INTERLOCK

BACKGROUND OF THE INVENTION

The present invention relates generally to transmission controls, and more specifically to a direction control, a combination cruise and direction control, and a brake interlock system for a hydrostatic transmission.

Controls for an off-road vehicle having a hydrostatic transmission typically include a direction control lever, or direction control pedals, along with some form of transmission speed ratio control which may be a separate lever or pedal or which may be combined with the direction control devices. With many transmission systems, a foot pedal is utilized to select speed ratio and must be continuously held in the desired position during operation of the vehicle which can result in operator fatigue. Maintaining the transmission in the desired speed ratio becomes difficult over extended periods of operation. Although numerous controls have been available to maintain the speed ratio control in a preselected position, most of the controls have suffered from one or more disadvantages. A number of the speed ratio controls require an extra lever or the like which adds to the cost and complexity of the transmission system and which is not always easily understood or easily operated. Adjusting linkages during manufacture of the vehicle to assure proper direction and speed ratio control can be a difficult and time-consuming task with some control arrangements. In addition, many types of presently available controls do not afford easy incorporation of the various systems such as cruise control and park brake interlocks into a conveniently manufacturable and usable package.

It is therefore an object of the present invention to provide an improved transmission control that overcomes the above-mentioned problems. It is a further object to provide such a control which is simple and logical in operation. It is still another object to provide such a control wherein the speed ratio of the transmission may be selectively maintained in a preselected condition.

It is a further object of the invention to provide an improved transmission speed ratio and direction control. It is another object to provide such a control which is easy to adjust during manufacture and easy to operate, and which facilitates the design and interaction of other vehicle systems such as brake and cruise controls. It is still another object to provide a transmission speed ratio and direction control wherein speed ratio is selected by a single foot pedal and direction by a single lever.

It is still another object of the present invention to provide an improved transmission control having a speed ratio maintaining mechanism which requires fewer control levers or pedals than most previously available transmission controls. It is a further object to provide such a control which is substantially improved ergonomically over most previously available controls. It is still another object to provide such a control which is relatively inexpensive and simple in construction and is easy to adjust during set-up.

It is still a further object of the present invention to provide an improved transmission control which has relatively few parts, is low in cost, and provides positive, fail-safe operation. It is another object to provide such a control arrangement which includes an improved brake interlock system. It is still another object to provide such a control including a direction control lever and a speed ratio control foot pedal, wherein a cruise control function may be selected at any time the direction control lever is in the position which selects the forward mode of operation.

In accordance with the above objects, a direction control lever is mounted on the console at one side of an off-road vehicle, and a single foot-operated speed ratio selecting pedal is rockably connected to the floor of the vehicle. The direction control lever and speed ratio control pedal are connected through shuttle structure to the transmission control rod of a hydrostatic transmission. The direction control lever has a reverse position wherein, when the foot pedal is depressed, the shuttle structure moves the transmission control arm through a range of ratios to operate the vehicle in the reverse direction. Pushing the direction control forward to a detent moves the shuttle structure to cause the foot pedal to operate the transmission control arm through a range of forward speed control ratios. When the forward direction is selected by the control lever, the lever may be pushed forwardly past the detent to a cruise control position. In the cruise control position, a pawl pivotally supported by the lever engages a tooth portion on the shuttle structure to maintain the transmission in the forward speed control ratio selected by the foot pedal. The cruise control for maintaining the transmission in the desired forward speed control ratio may be disengaged by simply moving the control lever rearwardly from the cruise control position to the detented forward position, or by depressing the brake pedal which automatically moves the lever rearwardly from the cruise control position. Therefore, the transmission control structure combines the operation of direction control and cruise control to eliminate the need for an additional cruise control lever or the like. A very simple, logical combination of controls is provided that is easy to understand and operate, that requires few additional parts, and that is relatively low in cost. The desired transmission speed ratio may be easily selected by the foot pedal in either the forward or reverse modes of operation and maintained by the cruise control during forward mode operation. The structure provides positive, fail-safe operation, and the transmission control arm or swash plate cam can be easily adjusted during manufacture with the engine running by placing the control linkages in a dead-center neutral position. The control arrangement also includes an improved brake interlock system, the design of which is facilitated by the side-mounted direction control lever and includes structure for providing a dead-center neutral condition preventing operation of the speed ratio control.

These and other objects, features and advantages of the present invention will become apparent to those skilled in the art from the description which follows and from the drawings.

BRIEF DESCRIPTION OF THE DRAWINGS

FIG. 1 is a side view of a portion of a transmission incorporating the transmission control arrangement and showing the control arrangement in the neutral position with the park brake on.

DESCRIPTION OF THE PREFERRED EMBODIMENT

Figure 1:
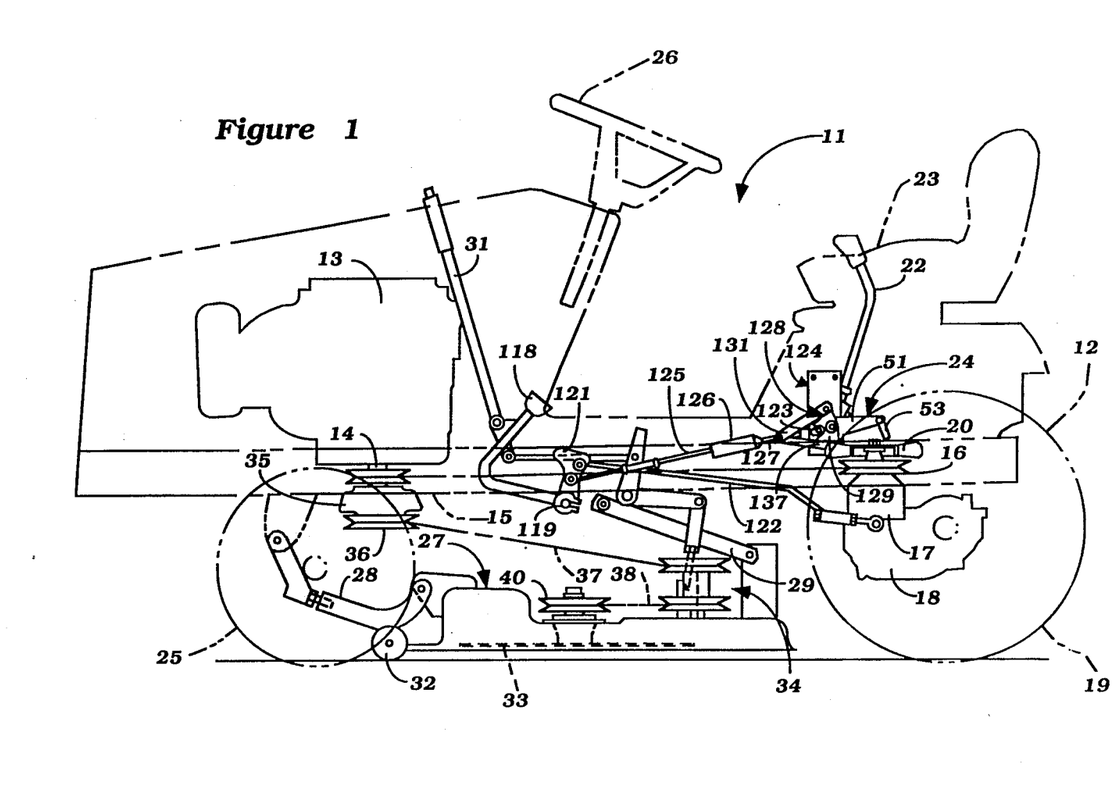

Referring to FIG. 1, there is shown a portion of a vehicle indicated generally at 10 including a frame supported for forward and reverse movement over the ground by wheels drivingly connected to an axle (not shown) which, in turn, is driven by a transmission 18. As shown, the vehicle 10 is an off-road vehicle such as a front mounted mower, and the transmission 18 is a hydrostatic transmission with continuously variable speed ratios in both the forward and the reverse direction. The transmission 18 includes a speed ratio control arm 22 normally biased to a central neutral position in a conventional manner, such as by a cam 23. Such hydrostatic transmission arrangements are well-known in the art, and therefore will not be described in further detail here.

Figure 2:
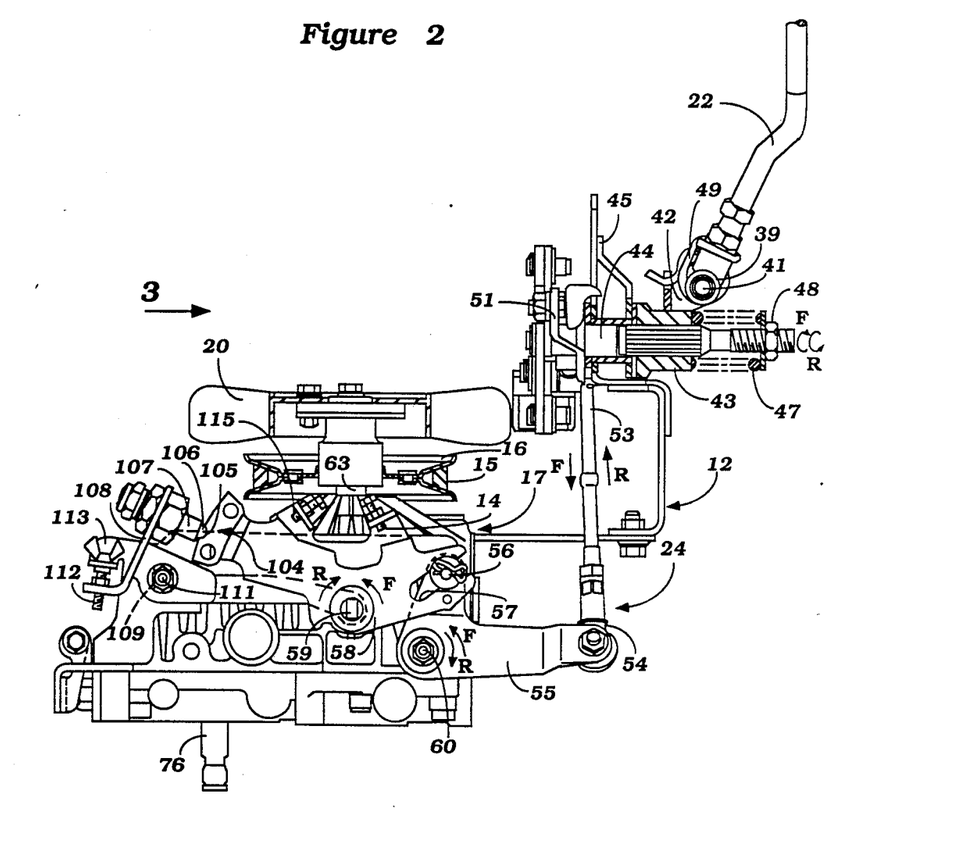
FIG. 2 is a view similar to FIG. 1 but showing the park brake off and the speed control lever positioned for selecting the forward direction of travel.
Figure 3:
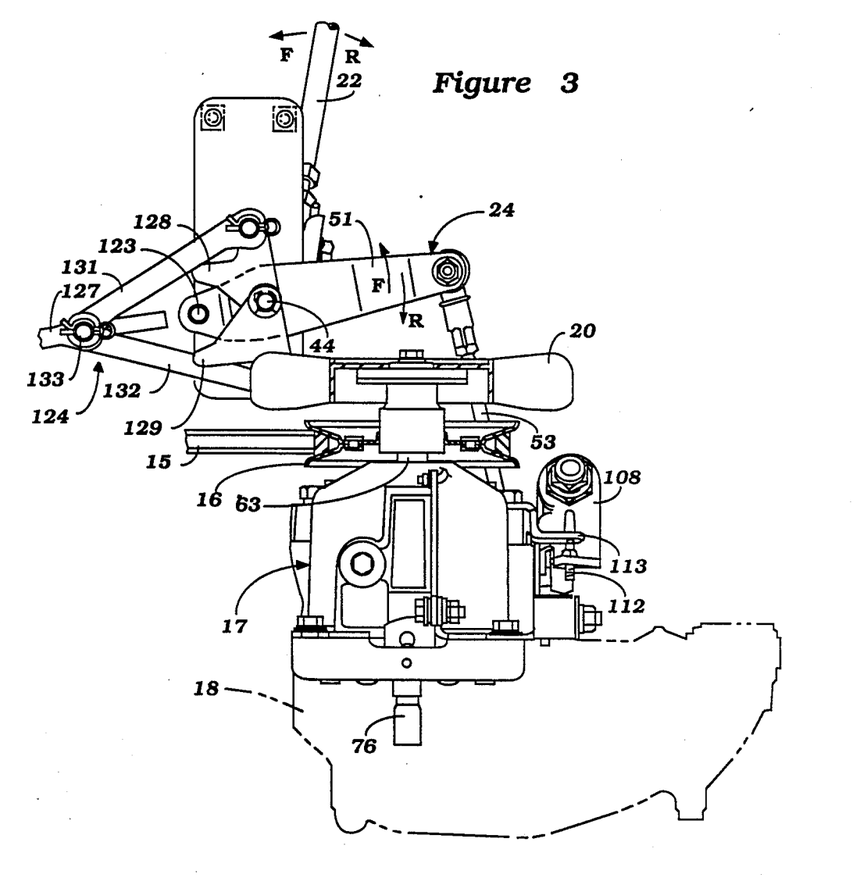
FIG. 3 a side view of a portion of the control arrangement of FIG. 1 with the direction control lever positioned in reverse.

As shown in FIGS. 1 and 2, a transmission control rod 24 is connected to the speed ratio control arm 22 and extends forwardly therefrom generally under the operator control station (indicated at 28 in FIG. 1) on one side of the vehicle 10. The rod 24 is connected to direction control and transmission ratio control structure indicated generally at 30. The structure 30 includes a direction control lever 32 movable between first and second positions (FIGS. 3 and 2, respectively) for selecting the reverse and forward directions of travel. In addition, the lever 32 is movable to a third position (FIG. 4) from the second position for maintaining a preselected transmission ratio, as will be described in detail below. The control structure 30 also includes a speed ratio control pedal 34 for changing the transmission speed control ratio when either the forward or the reverse directions are selected by movement of the direction control lever 32. The control structure 30 also includes cruise control structure indicated generally at 36 connected between the shift lever 32 and the control pedal 34 for maintaining the preselected transmission ratio without need for the operator to maintain his foot on the pedal 34.

A brake structure 40 is also provided which is connected through linkage structure indicated generally at 42 which includes a brake rod 44 (FIGS. 1 and 2) connected to conventional braking structure on the vehicle. The linkage structure 42 interacts with the direction control lever 32, as will be described in detail below, to move the lever to a park position upon operation of the brake system. Full operation of the brake system renders the speed ratio control pedal 34 inoperative to change the speed ratio of the transmission until the shift lever is moved from the park position. The brake structure 40 also includes brake locking structure 48 for selectively maintaining the brake in the engaged position.

The direction and transmission ratio control structure 30 will now be described in detail. The direction control lever 32 includes a lower end pivotally connected to the vehicle frame by a pivot 52. The lever 32 extends upwardly through a slot 54 located in the vehicle fender or other part of the vehicle structure and terminates in an upper hand grip portion. A trunnion 58 is connected to the lever above the pivot 52, and a spring loaded shifter rod 64 is slidably received within the trunnion and extends forwardly therefrom. A shifter bell crank 68 is pivotally connected to a second pivot 72 located forwardly of the first pivot 52. The bell crank 68 includes a generally upright arm 76 extending upwardly from the pivot 72 to a connection with the forward end of the shifter rod 64. The bell crank 68 also includes an arm 78 extending forwardly from the pivot 72 and terminates in an end which supports a transversely extending crank pin 82.

A pivoting member or shuttle pivot 92 is pivotally connected to the pivot 72 adjacent the bell crank 68 and includes a downwardly extending arm 94 pivotally connected to the forward end of the transmission control rod 24. The portion of the shuttle pivot 92 located forwardly of the pivot 72 is slotted at 96. The shuttle pivot 92 also includes a tooth portion 98 extending rearwardly from the pivot 72 with teeth 100 projecting towards the control lever 32.

A ratio control link 102 includes a pair of spaced side links 104 connected in side-by-side relationship on either side of the shuttle pivot 92 by a pin joint 106 which is slidably received within the shuttle pivot slot 96. The link 102 extends forwardly from the pin joint 106. The forward end of the link 102 is pivotally connected by a pivot 108 to the upper end of a lever arm 112 which extends between the side links 104. The lower end of the lever arm 112 is connected to a transverse shaft 114 pivotally connected to the vehicle frame and fixed for rocking with the speed ratio control pedal 34.

The central portion of the ratio control link 102 is slotted at 120, and the crank pin 82 of the bell crank 68 extends through the slot. When the shifter bell crank 68 is moved in the clockwise direction, the crank pin 82 acting in the slot 120 moves the ratio control link 102 downwardly about the pivot 108 to move the pin joint 106 into the lower end of the slot 96. Therefore, as the pedal 34 is depressed and the link 102 is moved forwardly by the lever arm 112, the shuttle pivot 92 will rotate in the counterclockwise direction to pull the transmission control rod 24 forwardly. Movement of the bell crank 68 counterclockwise about the pivot 72 causes the pin joint 106 to move upwardly in the slot 96 so that depressing the pedal 34 causes the shuttle pivot 92 to rotate in the clockwise direction and push the transmission control rod 24 in the rearward direction. Rotation of the shifter bell crank 68 is achieved by moving the direction control lever 32 within the slot 54. Moving the lever 32 forward from a neutral or park position moves the shift rod 64 forwardly to rotate the shifter bell crank 68 in the clockwise direction to the position shown in FIG. 2 so that depression of the pedal 34 results in increasing speed ratios in the forward direction of travel. Pivoting the lever 32 rearwardly from the park or neutral position causes rotation of the shifter bell crank 68 in the counterclockwise direction so that the pin joint 106 moves upwardly into the slot 96. Therefore, depression of the pedal 34 will cause the shuttle pivot 92 to rotate in the clockwise direction about the pivot 72 to move the transmission control rod 24 rearwardly to move the transmission through a range of rearward speed ratios.

The shifter rod 64 is slidably received within the trunnion 58 and is spring loaded by a spring 128 causing the shifter bell crank 68 to pivot in accordance with movement of the lever 32. However, the spring 128 permits the lever 32 to be moved forwardly from the forward position as shown in FIG. 2 while retaining the shifter bell crank in the position corresponding to the position it assumes when the lever 32 is in the forward position. A nut 132 threaded onto the aft end of the rod 64 assures that the rod moves rearwardly with the lever 32 as it is pulled rearwardly from the forward position.

The cruise control structure 36 includes a pawl 136 pivotally connected to a forward extension 138 located at the lower end of the lever 32 adjacent the pivot 52. The pawl 136 is biased upwardly by a tension spring 140 extending between the central portion of the pawl and a second extension 142 of the lever 32. The pawl 136 extends forwardly from its pivotal connection with the lever 32 toward the tooth portion 98 of the shuttle pivot 92. A pin 152 is interposed between the pivot 52 and the tooth portion 98, and the upper edge of the pawl 136 generally rides on the lower portion of the pin 152 when the lever 32 is in the reverse or forward positions, or any position within the range between the reverse and forward positions. As the lever 32 is pushed forwardly, the pivotal connection of the pawl 136 with the lever moves downwardly and forwardly causing the forward pointed portion of the pawl to approach, but not touch, the tooth portion 98. By moving the lever 32 transversely and then forwardly in the slot 54 to the cruise control position (FIG. 4), the pivotal connection of the pawl with the lever 32 moves downwardly and forwardly a sufficient distance so that the pointed portion of the pawl 136 moves into engagement with the teeth 100 of the portion 98. Once the pawl engages the tooth portion 98, the spring 140 maintains the pawl in engagement with the teeth 100 thereby locking the shuttle pivot 92 in the position selected by the pedal 34 at the time the lever 32 was pushed forwardly into the cruise control position. With the lever 32 in the forwardmost cruise control position, the transmission control rod 24 is held in the preselected position against the bias of the return-to-neutral cam arrangement (FIGS. 1 and 2) located on the transmission control arm 22. To disengage the cruise control, the operator simply moves the lever 32 rearwardly from the forward cruise control position which removes the pawl 136 out of contact with the tooth portion 98 so that the shuttle pivot 92 and therefore the transmission control rod 24 is again controlled by depression of the pedal 34. The fixed pin 152 prevents further contact of the pawl 136 with the tooth portion 98 until the lever 32 is moved into the cruise control position from the forward position shown in FIG. 2. If for any reason the spring 140 should fail, the pawl 136 will then simply hang freely so that it cannot engage the tooth portion 98 of the shuttle pivot 92. The bias on the transmission control arm 22 which normally returns the arm to the neutral position causes a tension in the control rod 24 which helps maintain engagement of the pawl (FIG. 4) with the teeth 100 in the tooth portion 98. As can be clearly appreciated in the drawings (FIG. 3), the pawl 136 will be far removed from the tooth portion 98 when the lever 32 is moved to the reverse position so that the cruise control function can not be established while the transmission is in reverse.

The brake structure 40 includes a brake pedal 160 pivotally connected at 162 to the vehicle frame. A rod 164 is connected either to the pedal 160 as shown or to a brake arm (not shown) for movement forwardly with the pedal as it is depressed. The aft end of the brake rod 164 is connected to a brake pivot lever 168. The upper portion of the brake pivot lever 168 is pivotally connected to the vehicle frame at 172. The lower end of the lever 168 is connected to the forward end of the brake rod 44. A pin 174 extends transversely through the central portion of the lever 168 for rocking therewith about the pivotal connection 172 as the brake pedal 160 is moved fore-and-aft. The lever 168 is offset slightly rearwardly of the lower portion of the direction control lever 32 with the swinging pin 174 located adjacent the lower portion of the lever 32. A spring 178 is tensioned between the lever 168 and the vehicle frame to bias the brake rod 144 rearwardly to a non-braking position. With the brake pedal 160 in the normal non-depressed operating position, the swinging pin is offset rearwardly from the lower portion of the lever 32 a sufficient distance that it does not interfere with the movement of the lever 32 forwardly into the cruise control position. However, if the brake pedal 160 is depressed with the lever 32 in the cruise control position (FIG. 4), the lever 174 will be pulled by the brake rod 164 in the counterclockwise direction causing the pin 174 to swing into contact with the lower portion of the lever 32 below the pivot 52 thereby causing the lever 32 to rotate in the counterclockwise direction so that the pawl 136 is pulled from the tooth portion 98 to release the cruise control. The release of the cruise control occurs before the brake rod 44 is pulled a sufficient distance forward to engage the brakes on the vehicle. Full depression of the brake pedal 60 causes the brake pivot lever 168 to swing the pin 174 a sufficient distance in the forward direction to move the lever 32 completely to the central park or neutral position. In this position (dead-enter), the axes of the pivots 72 and 108 and the pin joint 106 to lie along a straight line (FIG. 1) with the pin joint 106 centrally located within the slot 96 thereby preventing movement of the shuttle pivot 92 so that the transmission control arm 92 is biased to the central neutral position and can not be engaged in either the forward or reverse directions, until the lever 32 is again moved from the park position. Spring-loaded overtravel protection (not shown) may be provided to protect the linkage if the pedal 34 is pushed to the floor when the transmission is in either the reverse or the dead-center neutral position. The structure 30 may be conveniently pinned in the dead-center neutral position (FIG. 1) during assembly of the control arm 22 so that with the vehicle engine running the transmission can be set to neutral.

A brake latch 182 is pivotally connected at its aft end to a pivot 184 connected to the vehicle frame and is rockable upwardly, when the brake pedal 160 is fully depressed, into a latching condition (FIG. 1) with the pin 174 to prevent the lever 168 from rocking in the clockwise direction away from the full braking position. To activate the brake latch 182, a rod 188 is connected to the latch forwardly of the pivot 184 and extends upwardly through a keyhole slot 190 in the vehicle fender or body portion adjacent the control lever 32. With the brake 160 fully depressed, the operator can pull up on the rod 188 to move the latch 182 into engagement with the pin 174. To release the brakes, the operator simply moves the rod 184 to the keyhole position to permit the latch 182 to swing downwardly out of engagement with the pin 174. With the latch 182 engaged (FIG. 1) movement of the lever 32 forwardly from the neutral position is prevented.

Figure 4:
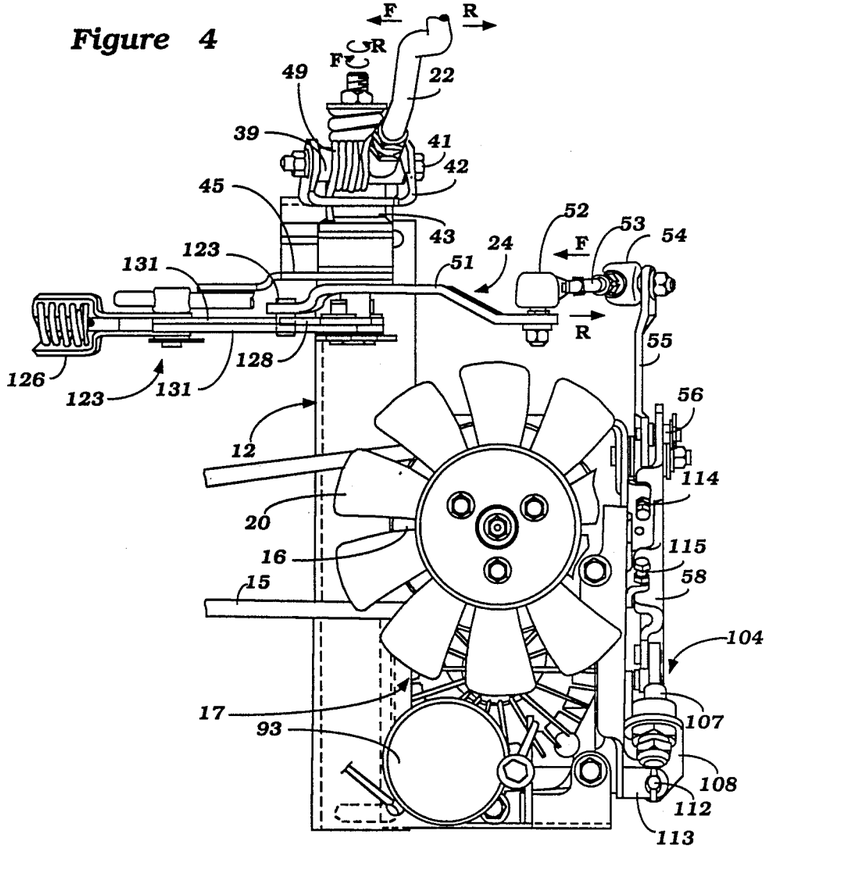
FIG. 4 is a view similar to FIG. 3, but showing the control lever pushed forwardly to the cruise control position.
Figure 5:
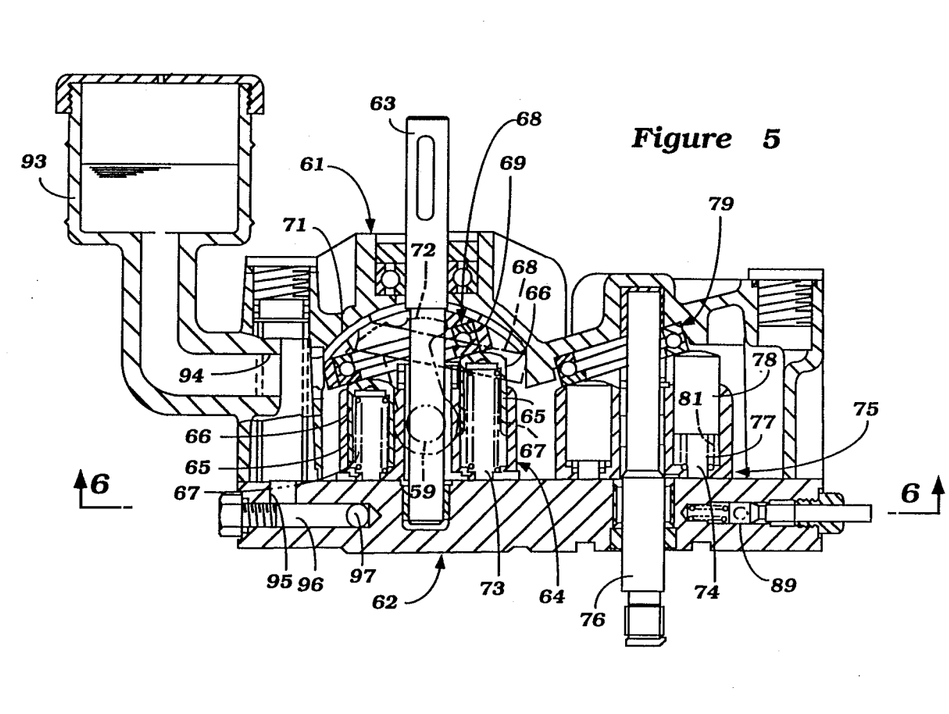
Figure 6:
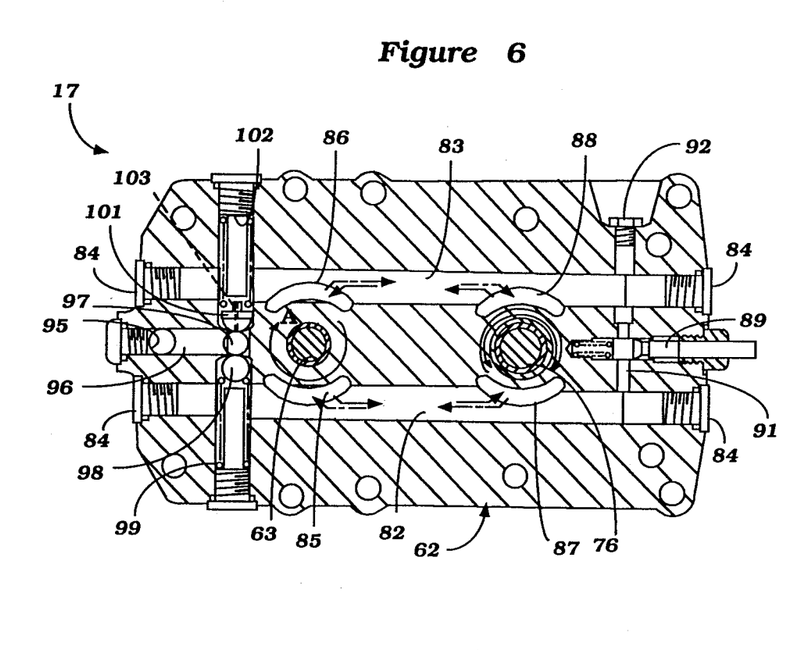

The lever 32 may be spring loaded toward a preselected position by a spring (not shown) tensioned between the lever and the vehicle frame. Preferably, the lever 32 is biased toward the forward position. Alternatively, the lever may be detented to the reverse, neutral and forward positions. As shown in FIG. 4, a detent 196 is provided in the slot 54 so that movement of the lever 32 in the transverse direction is necessary before the lever can be moved from the forward position to the cruise control position.

In operation, the operator sets the throttle control on the vehicle engine to the desired operating speed and moves the shift lever 32 to the forward position. This, in turn, moves the shift rod 64 forwardly to rotate the shifter bell crank 68 in the clockwise direction which moves the pin joint 106 to the lowermost position within the slot 96 of the shuttle pivot 92. Thereafter, depression of the pedal 34 rotates the lever arm 112 in the clockwise direction to move the ratio control link 102 forwardly causing the shuttle pivot 92 to rock in the counterclockwise direction about the pivot 72 to pull the transmission control rod 24 forwardly and move the control arm 22 forwardly from the neutral position. The pedal 34 is depressed until the desired forward speed ratio is provided. If the operator wishes to maintain this forward speed ratio, he simply grasps the upper portion of the lever 32 and moves the lever forwardly past the detent 196. The spring 128 on the rod 64 permits forward movement of the lever without moving the shifter bell crank 68 from the forward position. As the lever 32 is moved forwardly to the cruise control position, the pawl 136 moves forwardly and rocks upwardly about its pivotal connection with the lower end of the lever 32 until the spring 140 pulls the pawl 136 into engagement with the teeth 100 on the shuttle pivot 92 thereby locking the cruise control in the desired speed ratio and preventing the return to neutral forces on the control arm 22 from returning the transmission to the neutral condition. To disengage the cruise control, the operator simply pulls back on the shift lever 32 until the pawl 136 is removed from contact with the shuttle pivot 92 and is prevented from further contact therewith by the fixed pin 152. Alternatively, the operator may step on the brake pedal 160 to rotate the brake pivot lever 168 until the pin 174 contacts the lower end of the shift lever 32 and moves the lever in the counterclockwise direction to disengage the pawl 136.

If the operator wishes to operate the vehicle in the reverse direction, he simply pulls rearwardly on the lever 32 which causes the shifter rod 64 to move the shifter bell crank 68 in the counterclockwise direction so that the crank pin 82 rotates the ratio control link 102 upwardly (FIG. 3) to the upper end of the slot 96 in the shuttle pivot 92. Thereafter, depression of the pedal 34 causes the shuttle pivot 92 to rotate in the clockwise direction about the pivot 72 to move the transmission control rod 24 rearwardly and move the control arm 22 through a range of rearward control ratios. Therefore, it can be appreciated that the lever 32 and pedal 34 operate in a similar fashion to the shift control and accelerator pedal, respectively, on an automobile with the speed of the vehicle in either the forward or the reverse direction directly related to the amount of depression of the pedal.

Having described the preferred embodiment, it will be apparent that modifications can be made without departing from the scope of the invention as defined in the accompanying claims.

I claim:

1. Direction and speed ratio control structure for a hydrostatic transmission having a control arm movable from a neutral position through first and second ranges of positions corresponding to forward and reverse speed ratio ranges, respectively, of the transmission, the control comprising:
   a shuttle member operably connected to the control arm;
   a movable control link connected to and positionable with respect to the shuttle member between first and second positions;
   a movable speed ratio control;
   means connecting the speed ratio control to the control link for operating the shuttle member to move the control arm over the first range of first positions corresponding to the forward range of speed ratios when the control link is in the first position and the speed ratio control is moved in a preselected direction, and to move the control arm over the second range of positions corresponding to the reverse range of speed ratios when the link is in the second position and the speed ratio control is moved in said preselected direction; and
   direction control means comprising a single lever movable between forward and reverse selecting positions and connected to the control link for moving the link between the first and second positions, respectively, said lever also movable to a cruise control position for selectively maintaining the transmission in a preselected forward speed ratio.

2. The invention as set forth in claim 1 wherein the speed a ratio control comprises a foot pedal and the direction control means comprises a hand-operated lever.

3. Direction and speed ratio control structure for a reversible hydrostatic transmission having a control arm movable from a neutral position through forward and reverse speed ratio ranges, the control comprising:
   a shuttle member operably connected to the control arm;
   a movable control link connected to and positionable with respect to the shuttle member between first and second positions;
   a movable speed ratio control;
   means connecting the speed ratio control to the control link for operating the shuttle member to move the control arm over a range of first positions corresponding to the forward speed ratio range when the control link is in the first position and the control is moved in a preselected direction, and to move the control arm over a range of second positions corresponding to the reverse speed ratio range when the link is in the second position and the control is moved in said preselected direction;
   direction control means connected to the control link for moving the link between the first and second positions; and
   means for establishing a control link dead-center neutral condition wherein the speed ratio control is inoperable to move the control arm from the neutral position.

4. The invention as set forth in claim 1 wherein the shuttle member comprises a pivoting member, means connecting the pivoting member for rocking a first direction about a pivotal axis by the control link when the control link is in the first position and in a direction opposite the first direction when the control link is in the second position.

5. The invention as set forth in claim 4 wherein the pivoting member is slotted and the control link is received by and movable along the slot.

6. The invention as set forth in claim 3 further including cruise control means operably associated with the direction control means for selectively maintaining the transmission in a preselected forward speed ratio.

7. Direction and speed ratio control structure for a reversible hydrostatic transmission having a control arm moveable from a neutral position through forward and reverse speed ratio ranges, the control comprising:
   a shuttle member operably connected to the control arm;
   a movable control link connected to and positionable with respect to the shuttle member between first and second positions;
   a movable speed ratio control;
   means connecting the speed ratio control to the control link for operating the shuttle member to move the control arm over a range of first positions corresponding to the forward range of speed ratios when the control link is in the first position and the control is moved in a preselected direction, and to move the control arm over a range of second positions corresponding to the reverse range of speed ratios when the link is in the second position and the control is moved in said preselected direction;
   direction control means connected to the control link for moving the link between the first and second positions;
   cruise control means operably associated with the direction control means for selectively maintaining the transmission in a preselected forward speed ratio; and
   wherein the direction control means comprises a hand-operated lever movable from a forward selecting position to a cruise control selecting position, said cruise control means including means connected between the lever and the shuttle member and selectively restricting movement of the shuttle member.

8. The invention as set forth in claim 2 further including braking structure having an operable brake control, and means connected between the braking structure and the lever for moving the lever upon operation of the brake control.

9. The invention as set forth in claim 3 further including engageable braking structure, said braking structure including a parking brake latch selectively locking the braking structure in an engaged position, and including means for maintaining the dead-center neutral condition when the braking structure is locked in the engaged position.

10. A combination speed and cruise control for a transmission of a vehicle, the transmission being shiftable to select forward and reverse directions of vehicle travel, the control comprising:
   a direction control lever operably connected to the transmission and movable between first and second positions for selecting reverse and forward directions of vehicle travel, respectively, said lever also movable to a third position wherein the forward direction of travel is selected;
   speed control means for selectively varying the ratio of the transmission when the control lever is in the first or second positions; and
   cruise control means connected between the control lever and the speed control means for maintaining the selected transmission ratio when the control lever is in the third position.

11. The invention as set forth in claim 10 wherein the cruise control means includes a member connected to the direction control lever and engageable with the speed control means upon movement of the control lever to the third position.

12. The invention as set forth in claim 11 wherein the member comprises a pawl pivotally connected to the control lever and wherein the speed control means includes a tooth member selectively engageable by the pawl when the control lever is moved to the third position.

13. The invention as set forth in claim 11 wherein the transmission includes a control arm normally biased to a neutral position, a shuttle pivot operably connected to the control arm and wherein the speed control means includes a foot pedal operably connected to the shuttle pivot, said cruise control means comprising means for maintaining the shuttle pivot in a preselected position.

14. The invention as set forth in claim 13 wherein the means for maintaining the shuttle pivot in a preselected position comprises a tooth member connected to the shuttle pivot and a pawl rockably connected to the direction control lever.

15. The invention as set forth in claim 14 including a speed ratio control link connected between the pedal and the shuttle pivot, and a shifter bell crank connected between the link and the direction control lever.

16. A transmission control assembly for varying speed ratio and selectively maintaining a preselected speed ratio of a reversible vehicle transmission, comprising:
   a first control movable between a first and a second position for selecting the vehicle direction;
   a second control for selecting the transmission speed ratio;
   wherein the first control is movable from the second to a third position wherein in the third position the selected direction corresponding to the second position is maintained; and
   cruise control means connected between the first and second controls and responsive to the movement of the first control to the third position for maintaining a preselected transmission speed ratio.

17. The invention as set forth in claim 16 including a tooth member connected for movement with the second control and a pawl connected for movement with the first control and movable into contact with the tooth member as the first control is moved from the second to the third positions.

18. The invention as set forth in claim 17 wherein the first control includes a hand-operated lever and the second control includes a foot-operated pedal.

19. The invention as set forth in claim 18 including a link connected to the foot-operated pedal, a shuttle connected to the link, and a crank member connected between the lever and the link for moving the link relative to the shuttle between first and second control positions corresponding to the first and second positions, respectively, of the first control.

20. The invention as set forth in claim 19 wherein depression of the accelerator pedal when the link is in either the first or second positions increase the transmission speed ratio.

21. Direction and brake control structure for a vehicle having engageable brake structure and a reversible transmission, comprising:

a direction control lever operably connected to the transmission and movable between reverse, neutral and forward selecting positions;

a brake actuating linkage operably connected to the brake structure for engaging the brake structure;

means for automatically moving the control lever to the neutral position when the brake structure is engaged including means connected to the linkage for engaging the lever upon operation of the brake actuating linkage; and further including a positionable speed-selecting link operably associated with the lever, a speed control connected to the speed-selecting link, and means for rendering the speed control inoperative upon movement of the lever to the neutral position.

22. The invention as set forth in claim 21 wherein the speed connecting link is shiftable by the lever between opposed reverse and forward selecting positions and a central dead-center position, said means for rendering the speed control inoperative including shifter means connected to the lever for moving the link to the dead-center position.

23. The invention as set forth in claim 22 including latch means for locking the brake structure in the engaged condition and maintaining the control lever in the neutral position.

* * * * *

UNITED STATES PATENT AND TRADEMARK OFFICE
CERTIFICATE OF CORRECTION

PATENT NO. : 4,958,535

DATED : September 25, 1990

INVENTOR(S) : James A. Swartzendruber

It is certified that error appears in the above-identified patent and that said Letters Patent is hereby corrected as shown below:

The title page showing the illustrative figure should be deleted to be replaced with the attached title page.

Sheets 1-3 of the drawings should be deleted to be replaced with Sheets 1-3 of drawings, consisting of Figs. 1-4.

In col. 8, line 30, delete "a" (first occurrence).

In col. 10, line 64, delete "increase" and insert --increases--.

In col. 12, line 10, delete "22" and insert --21--.

Signed and Sealed this

Twenty-first Day of April, 1992

Attest:

HARRY F. MANBECK, JR.

Attesting Officer  Commissioner of Patents and Trademarks

United States Patent [19]

Swartzendruber

[11] Patent Number: 4,958,535

[45] Date of Patent: Sep. 25, 1990

[54] TRANSMISSION CONTROL STRUCTURE INCLUDING A COMBINATION DIRECTION AND CRUISE CONTROL AND A BRAKE INTERLOCK

[75] Inventor: James A. Swartzendruber, West Bend, Wis.

[73] Assignee: Deere & Company, Moline, Ill.

[21] Appl. No.: 324,363

[22] Filed: Mar. 15, 1989

[51] Int. Cl.⁵ .................................. C09G 11/00
[52] U.S. Cl. .................................. 74/481; 74/474
[58] Field of Search ............... 74/471 R, 471, 474, 74/482, 481, 483 R, 480 R, 878, 475

[56] References Cited

U.S. PATENT DOCUMENTS

| | | | |
|---|---|---|---|
| 3,313,174 | 4/1967 | Walker et al. | 74/474 |
| 4,341,129 | 7/1982 | Bando | 74/481 |
| 4,346,617 | 8/1982 | Schroeder et al. | 74/481 |
| 4,496,035 | 1/1985 | Wanie | 74/474 X |
| 4,608,879 | 9/1986 | Ishida et al. | 74/474 |
| 4,759,417 | 7/1988 | Wanie et al. | 180/6.34 |

Primary Examiner—Leslie A. Braun
Assistant Examiner—Khoi Q. Ta

[57] ABSTRACT

Direction and transmission ratio control structure including a direction control lever movable between reverse and forward selecting positions and movable from the forward selecting position to a cruise control position wherein a preselected transmission speed ratio is maintained. The transmission speed ratio is selected by a foot pedal connected through a link and a shuttle pivot to the transmission control rod. The shuttle pivot includes a tooth portion which is engageable by a pawl located at the lower end of the direction control lever. Movement of the lever from the forward to the cruise control position moves the pawl into engagement with the tooth portion of the shuttle pivot. The pawl is automatically disengaged when the lever is moved from the cruise control position or when the brake pedal is operated. The link and shuttle pivot are operably associated with the direction control lever so that the speed ratio of the transmission is increased by depressing the foot pedal regardless of whether the direction control lever is in the forward or the reverse selecting position. A single latch is operable to both lock the brakes in an engaged condition and maintain the lever in a neutral position wherein the speed ratio control is disabled.

23 Claims, 3 Drawing Sheets